United States Patent [19]

Platt

[11] 4,033,495

[45] July 5, 1977

[54] TAPE DRIVE APPARATUS

[75] Inventor: Stephen A. Platt, Grand Haven, Mich.

[73] Assignees: Stephen A. Platt; Vernet B. Platt, both of Grand Haven, Mich.

[22] Filed: Feb. 6, 1976

[21] Appl. No.: 655,711

[52] U.S. Cl. .................... 226/186; 226/190
[51] Int. Cl.² ........................... B65H 17/22
[58] Field of Search .......... 226/181, 186, 187, 190, 226/191

[56] References Cited

UNITED STATES PATENTS

| | | | |
|---|---|---|---|
| 2,341,636 | 2/1944 | Luehrs | 226/187 X |
| 2,788,209 | 4/1957 | Montijo | 226/186 |
| 2,943,852 | 7/1960 | Quirk | 226/187 X |
| 3,132,788 | 5/1964 | Johnson | 226/186 X |
| 3,253,758 | 5/1966 | Horiuchi | 226/181 |

Primary Examiner—Richard A. Schacher
Attorney, Agent, or Firm—Price, Heneveld, Huizenga & Cooper

[57] ABSTRACT

A pinch roller cooperating with the drive capstan of a tape playback apparatus includes a spool on which there is mounted a resilient tire member to selectively engage the capstan with a magnetic tape held between the tire and the capstan when in a driving position. The tire includes a circumferentially extending recess formed therein having a crowned surface for self-centering of the tape thereon, and a pair of annular shoulders spanning opposite sides of said recess for positively engaging the capstan on opposite sides of the tape thereby transmitting drive forces from the capstan to the side of the tape opposite the capstan through the tire. The spool includes slots communicating with the inner surfaces of the tire permitting a bonding agent to securely bond the tire to the spool.

2 Claims, 4 Drawing Figures

TAPE DRIVE APPARATUS

BACKGROUND OF THE INVENTION

The present invention relates to a tape drive apparatus and particularly to an improved pinch roller. In tape playback and recording apparatus, particularly inexpensive systems utilized primarily in the consumer market for the recording and playback of magnetic tape and incorporating reel-to-reel, cassette or cartridge-type tapes, the tape drive is accomplished by means of a driven capstan which comprises a shaft against which the tape is forcibly held by a pinch roller compressibly positioned against the side of the tape opposite the capstan. Typically, the pinch roller itself is not driven but is free wheeling and the speed regulated capstan drives the tape on only one side. In such systems, the takeup mechanism may provide a signficant portion of the drive for transporting the tape across the playback head.

In order to maintain the tape in a vertically aligned position with respect to the tape head and the capstan, the pinch roller typically is crowned such that the flat tape will ride to the crest of the crowned roller and stay at such position. The crowning of the pinch roller, however, prevents effective positive engagement of the roller with the capstan, thus the tape will be driven only on the capstan side.

In cassette tape systems, frequently the resistance of the tape to being moved across the playback head caused by momentary sticking of the reels within the cassette or other momentary frictional contact of the tape withn the cassette itself, causes speed changes of the tape across the playback head and which results in undersirable fluctuatjions of the audio output signal from the tape playback system. If recording, the problem will record the signal applied at a varying speed causing the same effect once played back at the desired speed.

In existing cassette-type tape recorders and playback systems, the cassette takeup spindle includes a slip clutch which is typically set within a range of 35-60 grams pull on the tape with the norm being 50 grams. If the slip is set too low, the tape can run past the capstan and accumulate on the takeup reel side fouling the system. If the slip clutch is set at too high a pull, it tends to pull the tape through the capstan and the capstan is ineffective in regulating the tape speed, thus causing the audio distortion.

Additionally, in manually operated systems such as described in my copending application entitled MANUAL TAPE APPARATUS, filed June 6, 1975, Ser. No. 584,465; (the disclosure of which is incorporated herein by reference) it is desirable to provide generating means in conjunction with the manual drive apparatus. The generating means coupled to the capstan drive requires relatively high speed for efficient generation of power for the device. With the present invention, the capstan diameter can be reduced in size and still maintain effective tape speed control and thereby the capstan can be rotated at a faster speed for a given tape speed, thus improving the generation of power for the amplifier portion of the system.

SUMMARY OF THE INVENTION

In order to overcome these problems and provide improved speed regulations for tape apparatus and assure that the tape is positively driven on both sides of the tape as it passes by the capstan, the improved pinch roller of the present invention is provided.

With the system of the present invention, it has been found that effective control of the tape speed is achieved with an increase of up to 300% in tape drive at the capstan, thereby permitting the takeup reel slip clutch to be set at the high end of the normal range or even higher without pulling the tape through the capstan thereby preventing tape fouling due to a low takeup reel slip clutch setting while maintaining fidelity of reproduction during playback or recording.

Apparatus embodying the present invention includes a pinch roller movable between operative and inoperative positions for cooperating with a tape drive capstan of a tape apparatus. The pinch roller includes a circumferentially recessed and crowned portion defining annular shoulders on opposite sides of the recess such that tape positioned between the annular shoulders is held between the pinch roller and the capstan with the shoulders engaging the capstan for providing drive between the pinch roller and the capstan.

DETAILED DESCRIPTION OF THE PREFERRED EMBODIMENT

Figure 1:
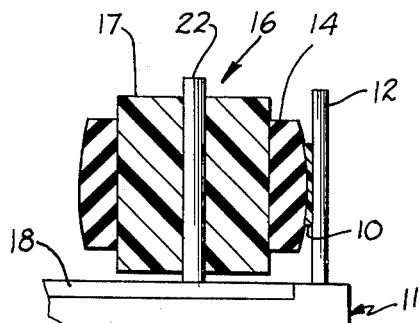
FIG. 1 is an enlarged cross section and fragmentary view of prior art capstan and pinch roller tape drive apparatus.

Referring initially to FIG. 1, there is shown a conventional tape drive and speed regulating mechanism of a tape apparatus 11 in which a magnetic tape 10 is positioned between a driven capstan 12 and the tire portion 14 of a pinch roller assembly 16, including a hub 17 on which the tire is positioned. Tire 14 is crowned such that the flat tape 10 will, as is well-known, ride to the peak of the crown and maintain its relative vertical position assisting the tape in maintaining its alignment with the pickup head (not shown). The pinch roller assembly 16 is typically mounted on a movable carriage member 18 such that it can be moved away from capstan 12 for initially feeding the tape into the system by inserting the cassette in a cassette system; and against the capstan as shown in FIG. 1 during playback or recording modes of operation. Hub 17 of the pinch roller assembly 16 is rotatably mounted to shaft 22 permitting the free-wheeling pinch roller 16 to rotate as tape 10 is drawn between the tire 14 and capstan 12 by the driven capstan and the takeup reel (not shown).

With such an arrangement, the crowned tire 14, used for maintaining the centering of tape 10, effectively prohibits positive and continuous engagement between tire 14 and capstan 12 thereby limiting the regulation of the tape speed 10 therebetween since the tape effectively is only engaged on one side by the capstan 12 which typically is a relatively small diameter shaft. This provides relatively inefficient speed control for the system even though some forces are transmitted through the tape itself to the pinch roller for assisting the capstan in regulating the speed of the tape. As noted above, the result frequently, and particularly if the takeup spindle slip clutch is improperly adjusted and the cassette incurs momentary frictional drag, is that capstan and pinch roller drive mechanism, as shown in FIG. 1, are ineffective in maintaining the desired speed regulation for the tape.

Figure 3:
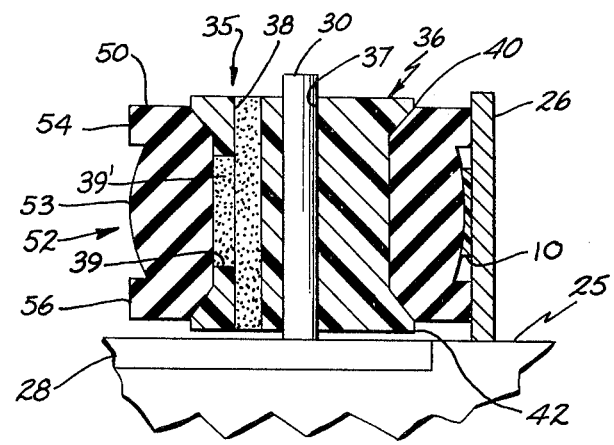
FIG. 3 is an enlarged cross section and fragmentary view of a tape transport taken along the section III—III of FIG. 2 and including the improved pinch roller of the present invention.
Figure 2:
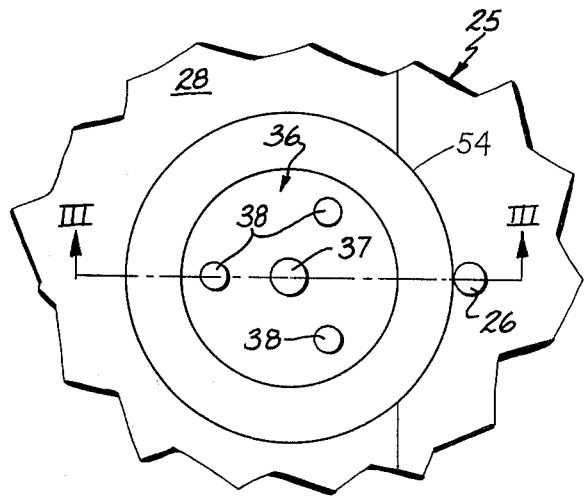
FIG. 2 is an enlarged, fragmentary plan view of a tape playback apparatus embodying the present invention.
Figure 4:
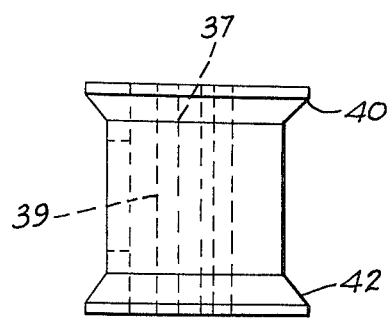
FIG. 4 is a front elevational view of a portion of the pinch roller of the present invention.

Referring now to FIGS. 2 through 4, the apparatus of the present invention is mounted on a tape playback apparatus 25 shown schematically in the figures, which includes a capstan 26 mounted to the apparatus and driven in a conventional manner. Also, the apparatus 25 can be of the type disclosed in may copending application identified above. A carriage assembly 28 is provided to which there is positioned a vertically extending axle 30 for the pinch roller assembly 35. The pinch roller assembly 35 includes a spool 36 with a vertically extending central aperture 37 permitting the spool 36 to be rotatably mounted to axle 30. Carriage 28 is movable between an inoperative position with the pinch roller assembly 35 spaced from capstan 26 and an operative position in engagement with the capstan as shown in FIG. 2.

Spool 36 further includes three additional apertures 38 radially spaced from aperture 37 and extending longitudinally through the spool. Communicating with each aperture 38 is a slot 39, as best seen in FIG. 3, which extends radially through the body of the spool. This permits a bonding agent 39' such as a commercially available latex or rubberized adhesive to be injected into apertures 38 through slots 39 to bond tire 50 to the spool. In the preferred embodiment, spool 36 was manufactured of Nylon and machined to include a pair of annular shoulders 40 and 42 at the top and bottom respectively, each of which have tapered side walls for assisting in the secure mounting of tire 50 around the spool. Spool apertures 38 serve the additional purpose of providing drive points for the rotation of the spool and tire mounted thereto during the forming of the tire recess as described in greater detail below.

The tire 50 comprises an annular washer made of a resilient material initially having a generally rectangular, cross-sectional configuration and a durometer hardness of preferably between 60 and 80. The tire is sufficiently resilient to be fitted over spool 36 as shown in FIGS. 2 and 3 such that the corners abutting the tapered sidewalls of shoulders 40 and 42 compress as shown in FIG. 3 to conform to the outer surface configuration of the spool. In the preferred embodiment, neoprene was employed as the tire material.

Once the tire 50 is secured on spool 36, a centrally located annular recess (as best seen in FIG. 3) is crush ground into the tire to define a convexly curved or crowned surface 53 having a radius of a curvature of approximately one inch and a vertical height of approximately .2 inches for the cassette tape system of the preferred embodiment which uses ⅛ inch tape, having a thickness of 1 mil. Spanning opposite sides of the crowned recess 52 is a pair of integrally formed annular shoulders 54 and 56 each having a vertical height of 0.060 inches in a preferred embodiment and which extends radially outwardly to lie in approximately the same vertical plane as the crown of recess 52. Shoulders 54 and 56 positively engage capstan 26, while at the same time securely holding tape 10 between the crown portion of recess 52 and the capstan 26.

Tire 50 is crush ground by a grinding wheel having a width substantially equal to that of the tire and which is dressed to define the shape of recess 52 and the surrounding shoulders only in reverse image thereof. The grinding wheel is dressed by using a deep case hardened steel member conforming to the desired shape of the tire recess. A spindle with a three point drive is used to securely hold the spool (using apertures 38) onto the spindle which is rotated at approximately 200 rpm with the tire engaging the dressed grinding wheel rotating at approximately 3600 rpm momentarily to achieve the desired crown recessed configuration. The resultant pinch roller, as seen FIG. 3, defines a recess having a width slightly wider than the tape used in the system and a crowned surface such that the tape is self-centering within the recess. The cutaway portion of the tire defining the recess integrally defines upper and lower annular shoulders extending circumferentially around the tire and extending into positive engagement with the drive capstan of the tape apparatus with which the pinch roller is employed. Such an arrangement provides, as noted above, a significantly improved tape drive and speed regulating assembly for use in all types of tape apparatus.

It will become apparent to those skilled in the art that various modifications to the preferred embodiment disclosed herein can be made. Thus, for example, the one inch radius of curvature used with the 0.525 inch outer diameter pinch roller assembly could be varied as required depending upon the size of tape with which the pinch roller is to be used. Additionally, instead of a gradually curved radius defining the crowned surface of the recess, the recess could be chamfered at, for example, an angle of 5° from its center outwardly and into the tire material to define a crowned surface which is non-spherical, but which would be effective in centering the tape within the recess. Also, materials different from those used in the preferred embodiment could, of course, be employed. The pinch roller could comprise an integral, one-piece tire and spool. These and other modifications to the preferred embodiment will, however, fall within the scope and spirit of the invention as defined by the appended claims.

The embodiments of the invention in which an exclusive property or privilege is claimed are defined as follows:

1. For use in a magnetic tape playback apparatus, a pinch roller movable between operative and inoperative positions for cooperting with a tape drive capstan, said pinch roller comprising: a spool having a central aperture and a tire mounted to said spool, said tire including a circumferentially recessed and convexly curved portion defining annular shoulders on opposite sides of said recess such that tape positioned between said annular shoulders is held between said pinch roller and said capstan with said shoulders engaging the capstan for providing positive drive between the pinch roller and the capstan when said roller is in the operative position, and wherein said spool further includes a plurality of tire mounting apertures extending longitudinally through said spool and radially spaced from said central aperture each tire mounting aperture including a slot extending radially outwardly through said spool to communicate with said tire, and a bonding adhesive filling said slots to bond said tire to said spool.

2. The apparatus as defined in claim 1 wherein said tire is made of Neoprene.

* * * * *

UNITED STATES PATENT AND TRADEMARK OFFICE
CERTIFICATE OF CORRECTION

PATENT NO. : 4,033,495
DATED : July 5, 1977
INVENTOR(S) : Stephen A. Platt

It is certified that error appears in the above-identified patent and that said Letters Patent are hereby corrected as shown below:

Column 1, line 33:
"withn" should be ---within---

Column 1, line 35:
"fluctuatjions" should be ---fluctuations---

Column 2, line 20:
"providing drive" should be ---providing positive drive---

Column 3, line 4:
"mechanism" should be ---mechanisms---

Column 3, line 12:
"may" should be ---my---

Signed and Sealed this

Twenty-second Day of November 1977

[SEAL]

Attest:

RUTH C. MASON
Attesting Officer

LUTRELLE F. PARKER
Acting Commissioner of Patents and Trademarks